United States Patent
Kim et al.

(10) Patent No.: US 6,665,135 B2
(45) Date of Patent: Dec. 16, 2003

(54) MAGNETIC WRITE CIRCUIT WITH PULSE MODE POWER SUPPLY

(75) Inventors: Jong K. Kim, Longmont, CO (US); Elanguvan Nainar, Longmont, CO (US)

(73) Assignee: Agere Systems Inc., Allentown, PA (US)

(*) Notice: Subject to any disclaimer, the term of this patent is extended or adjusted under 35 U.S.C. 154(b) by 354 days.

(21) Appl. No.: 09/877,532

(22) Filed: Jun. 8, 2001

(65) Prior Publication Data

US 2002/0196573 A1 Dec. 26, 2002

(51) Int. Cl.$^7$ ................................................. G11B 5/09
(52) U.S. Cl. .............................. 360/46; 360/68; 360/66; 327/110
(58) Field of Search ........................... 360/46, 68, 67, 360/66; 327/108, 110, 109, 494, 530, 544

(56) References Cited

U.S. PATENT DOCUMENTS 6,121,800 A * 9/2000 Leighton .................... 327/110
6,246,269 B1 * 6/2001 Schuler ...................... 327/110

* cited by examiner

*Primary Examiner*—Alan Faber
(74) *Attorney, Agent, or Firm*—Kinney & Lange, P.A.

(57) ABSTRACT

A disk drive system including a write circuit for controlling current through a magnetic write head includes an H-switch circuit and a pulse-mode power supply circuit. The H-switch circuit controls direction of current through the magnetic write head. The pulse-mode power supply circuit is connected to the H-switch circuit for providing a higher voltage pulse at a beginning of a switching event of the H-switch circuit to accelerate a change in direction of current through the write head, followed by a lower voltage until a next switching event.

33 Claims, 4 Drawing Sheets

MAGNETIC WRITE CIRCUIT WITH PULSE MODE POWER SUPPLY

BACKGROUND OF THE INVENTION

The present invention relates to a magnetizing current control circuit which operates with a magnetic write head in a magnetic data storage and retrieval system. In particular, the present invention relates to a magnetizing current control circuit having a higher switching rate and reduced power consumption.

In magnetic data storage and retrieval systems, a magnetic write head records two-logic-state data in a magnetic data storage medium such as a magnetic tape or magnetic disc. The magnetic write head has an inductive coil with currents provided therethrough in alternate directions, representing the data, to impart a series of alternate magnetic field patterns over time to the magnetic medium moving by it. Producing alternate magnetic field patterns over time entails switching the electric current through the inductive coil between forward and reverse directions therethrough to correspond to the data. Current in the inductive coil generates a magnetic field oriented in a direction corresponding to the direction of flow through the coil; thus, reversing the direction of current reverses the orientation of the magnetic field. The magnetic fields generated by the inductive coil currents intersect the magnetic medium to polarize adjacent magnetic medium regions which in effect serve as data symbol storage positions on the medium, and so form magnetic patterns along a corresponding one of more or less concentric tracks in the medium from which an information signal can be retrieved.

Controlling the directions and magnitudes of currents through the inductive coil is the purpose of a magnetizing current control circuit. A typical magnetizing current control circuit includes a switching network. The switching network is connected to the ends of the inductive coil in the magnetic write head at first and second head nodes, and includes four switching transistors arranged as pairs with each pair member connected to a corresponding one of these head nodes. One pair is switched on directing current flow in one direction through the inductive coil with the other pair switched off and, alternatively, this latter pair is switched on to direct current flow through the inductive coil in the opposite direction with the first pair being switched off. More specifically, the switching transistors are connected to the inductive coil such that a first switching transistor is connected between a first voltage source node and the first head node, a second switching transistor is connected between the first voltage source node and the second head node, a third switching transistor is connected between the first head node and a second voltage source node, and a fourth switching transistor is connected between the second head node and the second voltage source node.

One principal concern in the performance of magnetizing current control circuits is the duration of time needed to complete a switching of current direction through the inductive coil which directly affects the switching rate. Switching rate, a measure of how often the magnetizing current control circuit can reverse current direction through the inductive coil per unit of time, determines the maximum linear spatial density of data along a track in the magnetic medium. Ultimately, a higher switching rate yields denser data storage and thus greater total data capacity for a magnetic medium.

A key determinant of the current reversal switching time duration is the head swing voltage, i.e. the voltage difference between the head nodes of the magnetizing current control circuit. The larger the voltage drop applied in the opposite direction across the inductive coil after a switching to reverse the current therethrough, the quicker the change in direction of current through the inductive coil. This is because the voltage-current characteristic of an inductive coil is determined by $V=Ldi/dt+R_L I$, where V is the voltage across the inductive coil, di/dt is the rate of change of current over time through the inductive coil, L is the inductance of the inductive coil, $R_L$ is the resistance of the inductive coil, and I is the current through the inductive coil. Because the inductance of the inductive coil is constant and the resistance of the inductive coil is relatively small, there is a direct relationship between the voltage impressed across the inductive coil after switching and the rate of change of current over time through the inductive coil.

In typical magnetizing current control circuits, the head swing voltage is equal to the voltage difference between the emitters of the first and second switching transistors. In order to create a large voltage difference between the emitters of the first and second switching transistors after a switching to reverse the current through the inductive coil, a similarly large voltage difference is applied to the bases of the first and second switching transistors. This, however, typically requires the magnetizing current control circuit to be operated by a continuous high supply voltage, which in turn causes the circuit to have high power consumption.

Accordingly, there is a need for a magnetizing current control circuit that maximizes the head swing voltage while minimizing the power consumption of the circuit.

BRIEF SUMMARY OF THE INVENTION

The present invention is a disk drive system including a write circuit for controlling current through a magnetic write head. An H-switch circuit controls direction of current through the magnetic write head. A pulse-mode power supply circuit is connected to the H-switch circuit for providing a higher voltage pulse at a beginning of a switching event of the H-switch circuit to accelerate a change in direction of current through the write head, followed by a lower voltage until a next switching event.

DETAILED DESCRIPTION

Figure 1:
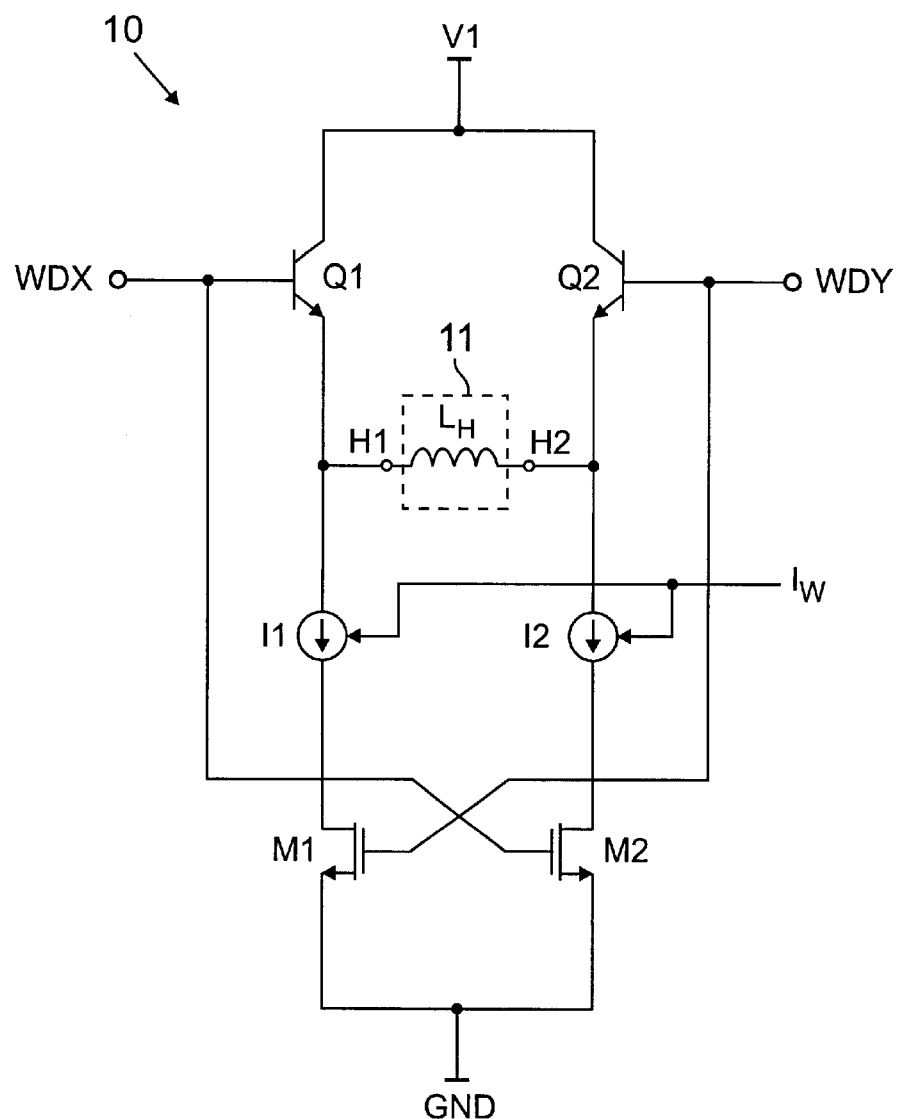
FIG. 1 shows a circuit schematic diagram of a prior art magnetic write circuit.

FIG. 1 shows a circuit schematic diagram of a prior art magnetic write circuit 10. Prior art magnetic write circuit 10 is part of a disk drive system and controls the magnitude and direction of current through a magnetic write head 11 represented in the diagram as an inductive coil $L_H$. Prior art magnetic write circuit 10 includes switching transistors Q1, Q2, M1, and M2, current generators I1 and I2, input signal circuit nodes WDX and WDY, circuit head nodes H1 and H2, and voltage source nodes V1 and GND.

Switching transistors Q1 and Q2 are npn bipolar junction transistors each having a base, a collector, and an emitter. Switching transistors M1 and M2 are NMOS transistors each having a gate, a drain, and a source. Current generators I1 and I2 are each portions of a current mirror circuit used to generate a reference current Iw. Input signal circuit node WDX is connected to the base of switching transistor Q1 and the gate of switching transistor M2, and input signal circuit node WDY is connected to the base of switching transistor Q2 and the gate of switching transistor M1. The collectors of switching transistors Q1 and Q2 are each connected to voltage source node V1, and the emitters of switching transistors Q1 and Q2 are connected respectively to circuit head nodes H1 and H2. Current generator I1 is connected between circuit head node H1 and the drain of switching transistor M1, and current generator I2 is connected between circuit head node H2 and the drain of switching transistor M2. The sources of switching transistors M1 and M2 are each connected to voltage source node GND.

In an initial input signal situation chosen for purposes of description, input signal node WDX has a high voltage (V1) and input signal node WDY has a low voltage (GND), for example. In the steady state in this situation, switching transistors Q1 and M2 are turned on and switching transistors Q2 and M1 are turned off. The voltages at circuit head nodes H1 and H2 are approximately V1−VBE, as the resistance of inductive coil $L_H$ is low (where VBE is the voltage drop across the base-emitter pn junction of transistor Q1). Current Iw is drawn from voltage source node V1, through the collector and emitter of switching transistor Q1, through magnetic write head 11 from head node H1 to H2, through current generator I2, through the drain and source of switching transistor M2, and into voltage source node GND.

When the input signal on nodes WDX and WDY is subsequently changed to then have a high voltage (V1) at input signal node WDY and a low voltage (GND) at input signal node WDX, switching transistor M1 is turned on and switching transistor M2 is turned off. In addition, the low voltage at input signal node WDX (which is equal to the voltage at the base of switching transistor Q1) causes the voltage at the emitter of switching transistor Q1 to initially drop to approximately −VBE, and the high voltage at input signal node WDY (which is equal to the base of switching transistor Q2) turns on switching transistor Q2 and causes the voltage at the emitter of switching transistor Q2 to rise to approximately V1−VBE.

Because the voltage at head node H1 (which is equal to the voltage at the emitter of switching transistor Q1) is approximately −VBE and the voltage at head node H2 (which is equal to the voltage at the emitter of switching transistor Q2) is approximately V1−VBE, a voltage drop of approximately V1 volts is initially created across inductive coil $L_H$ from head node H2 to H1. As a result, the current through inductive coil $L_H$ (which, prior to the change at input signal nodes WDX and WDY, was flowing through inductive coil $L_H$ from head node H1 to H2) will follow the change in polarity across inductive coil $L_H$ and ultimately change direction and flow through inductive coil $L_H$ from head node H2 to H1.

After the change in direction of current through inductive coil $L_H$ so that a current approximately equal to Iw now flows from head node H2 to H1, the voltage at head node H1 will begin to rise to nearly the voltage at head node H2. This is because once the direction of the current through inductive coil $L_H$ is established, the rate of change of the current will decrease to nearly zero because the resistance of inductive coil $L_H$ is relatively small. Also, the voltage at head node H2 is held approximately constant because the voltage drop VBE across the base-emitter pn junction of switching transistor Q2 (which is turned on) is approximately constant. This decreasing voltage across inductive coil $L_H$ causes switching transistor Q1 to turn off because the voltage at the emitter of switching transistor Q1 (which is equal to the voltage at head node H1) is no longer a VBE lower than the voltage at its base (which is held at approximately GND).

Therefore, because switching transistors Q2 and M1 are turned on and switching transistors Q1 and M2 are turned off with a high voltage at node WDY and a low voltage at node WDX, a current approximately equal to Iw is drawn from voltage source node V1, through the collector and emitter of switching transistor Q2, through magnetic write head 11 from head node H2 to H1, through the drain and source of switching transistor M1, and into voltage source node GND. As described above, a maximum voltage drop of approximately V1 volts is created across inductive coil $L_H$ from head node H2 to H1 at the beginning of the input situation to reverse the direction of current through inductive coil $L_H$.

When the input signal on nodes WDX and WDY is subsequently changed to again have a high voltage (V1) at input signal node WDX and a low voltage (GND) at input signal node WDY as in the initial input signal steady state situation described above, switching transistor M2 is turned on and switching transistor M1 is turned off. In addition, the low voltage at input signal node WDY (which is equal to the voltage at the base of switching transistor Q2) causes the voltage at the emitter of switching transistor Q2 to initially drop to approximately −VBE, and the high voltage at input signal node WDX (which is equal to the base of switching transistor Q1) turns on switching transistor Q1 and causes the voltage at the emitter of switching transistor Q1 to rise to approximately V1−VBE.

Because the voltage at head node H2 (which is equal to the voltage at the emitter of switching transistor Q2) is approximately −VBE and the voltage at head node H1 (which is equal to the voltage at the emitter of switching transistor Q1) is approximately V1−VBE, a voltage drop of approximately V1 volts is initially created across inductive coil $L_H$ from head node H1 to H2. As a result, the current through inductive coil $L_H$ (which, prior to the change at input signal nodes WDX and WDY, was flowing through inductive coil $L_H$ from head node H2 to H1) will follow the change in polarity across inductive coil $L_H$ and ultimately change direction and flow through inductive coil $L_H$ from head node H1 to H2.

After the change in direction of current through inductive coil $L_H$ so that a current approximately equal to Iw now flows from head node H1 to H2, the voltage at head node H2 will begin to rise to nearly the voltage at head node H1. This is because once the direction of the current through inductive coil $L_H$ is established, the rate of change of the current will decrease to nearly zero because the resistance of inductive coil $L_H$ is relatively small. Also, the voltage at head node H1 is held approximately constant because the voltage drop VBE across the base-emitter pn junction of switching transistor Q1 (which is turned on) is approximately constant. This decreasing voltage across inductive coil $L_H$ causes switching transistor Q2 to turn off because the voltage at the emitter of switching transistor Q2 (which is equal to the voltage at head node H2) is no longer a VBE lower than the voltage at its base (which is held at approximately GND).

Therefore, because switching transistors Q1 and M2 are turned on and switching transistors Q2 and M1 are turned off with a high voltage at node WDX and a low voltage at node WDY, a current approximately equal to Iw is drawn from voltage source node V1, through the collector and emitter of switching transistor Q1, through magnetic write head 11 from head node H1 to H2, through the drain and source of switching transistor M2, and into voltage source node GND. As described above, a maximum voltage drop of approximately V1 volts is created across inductive coil $L_H$ from head node H1 to H2 at the beginning of the input situation to reverse the direction of current through inductive coil $L_H$.

Figure 2:
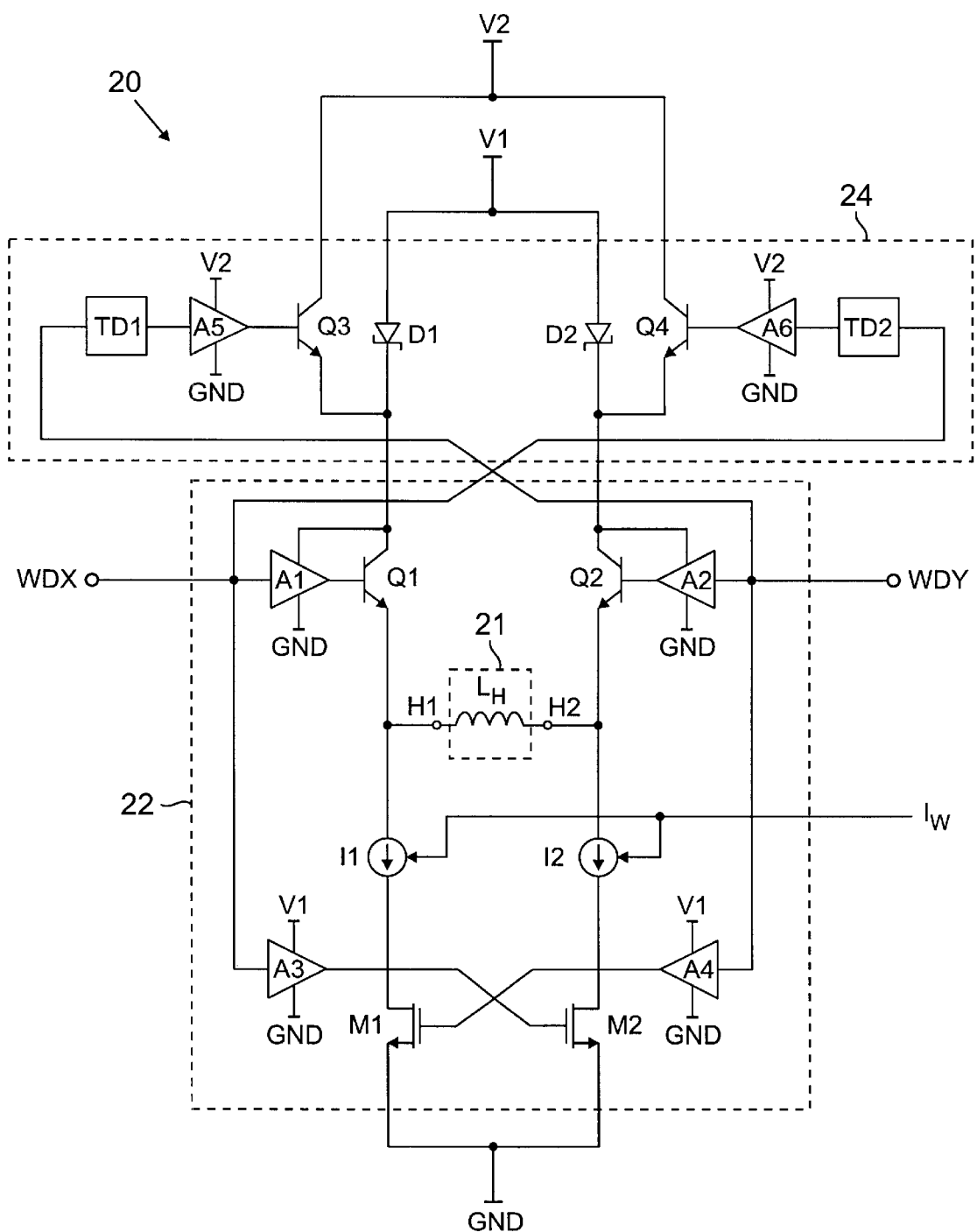
FIG. 2 shows a circuit schematic diagram of a first embodiment of a magnetic write circuit of the present invention.

FIG. 2 shows a circuit schematic diagram of a first embodiment of a magnetic write circuit 20 of the present invention. Magnetic write circuit 20 is part of a disk drive system and controls the magnitude and direction of current through a magnetic write head 21 represented in the diagram as an inductive coil $L_H$. Magnetic write head 21, which is coupled into the remainder of the circuit between circuit head nodes H1 and H2, includes inductive coil $L_H$ along with magnetic material positioned in magnetic fields generated by current therethrough. Magnetic write circuit 20 includes writer circuit 22, power supply circuit 24, input signal circuit nodes WDX and WDY, the circuit head nodes H1 and H2 previously mentioned, and voltage source nodes V1, V2, and GND (where a significantly higher voltage is provided at voltage source node V2 than at voltage source node V1). Magnetic write circuit 20 is preferably fabricated in an integrated circuit.

Writer circuit 22 includes switching transistors Q1, Q2, M1 and M2, current generators I1 and I2, and amplifiers A1–A4. Switching transistors Q1 and Q2 are npn bipolar junction transistors each having a base, a collector, and an emitter. Switching transistors M1 and M2 are NMOS transistors each having a gate, a drain, and a source. Current generators I1 and I2 are each portions of a current mirror circuit used to generate a reference current Iw. Amplifiers A1–A4 each have an input node, an output node, and first and second supply nodes, where the voltages at the first and second supply nodes are respectively the upper and lower limits of the voltage at the output node. Amplifiers A1 and A2 each exhibit a gain of V2/V1, while amplifiers A3 and A4 each do not exhibit any gain but are important for timing considerations. Input signal circuit node WDX is connected to the input nodes of amplifiers A1 and A3, and input signal node WDY is connected to the input nodes of amplifiers A2 and A4. The output node of amplifier A1 is connected to the base of switching transistor Q1, and the first and second supply nodes of amplifier A1 are connected respectively to the collector of switching transistor Q1 and voltage source node GND. The output node of amplifier A2 is connected to the base of switching transistor Q2, and the first and second supply nodes of amplifier A2 are connected respectively to the collector of switching transistor Q2 and voltage source node GND. The output node of amplifier A3 is connected to the gate of switching transistor M2, and the first and second supply nodes of amplifier A3 are connected respectively to voltage source nodes V1 and GND. The output node of amplifier A4 is connected to the gate of switching transistor M1, and the first and second supply nodes of amplifier A4 are connected respectively to voltage source nodes V1 and GND. The emitters of switching transistors Q1 and Q2 are connected respectively to circuit head nodes H1 and H2. Current generator I1 is connected between circuit head node H1 and the drain of switching transistor M1, and current generator I2 is connected between circuit head node H2 and the drain of switching transistor M2. The sources of switching transistors M1 and M2 are each connected to voltage source node GND.

Power supply circuit 24 includes transistors Q3 and Q4, diodes D1 and D2, time delay devices TD1 and TD2, and amplifiers A5 and A6. Transistors Q3 and Q4 are npn bipolar junction transistors each having a base, a collector, and an emitter. Diodes D1 and D2 are Schottky diodes each having an anode and a cathode. Time delay devices TD1 and TD2 each have an input node and an output node, and provide a time delay of about 100 ps to about 500 ps between the input node and the output node. Amplifiers A5 and A6 each have an input node, an output node, and first and second supply nodes, where the voltages at the first and second supply nodes are respectively the upper and lower limits of the voltage at the output node. Amplifiers A5 and A6 each exhibit a gain of V2/V1. Input signal circuit node WDX is connected to the input node of time delay device TD2, and input signal circuit node WDY is connected to the input node of time delay device TD1. The output nodes of time delay devices TD1 and TD2 are connected respectively to the input nodes of amplifiers A5 and A6. The output node of amplifier A5 is connected to the base of transistor Q3, and the first and second supply nodes of amplifier A5 are connected respectively to voltage source nodes V2 and GND. The output node of amplifier A6 is connected to the base of transistor Q4, and the first and second supply nodes of amplifier A6 are connected respectively to voltage source nodes V2 and GND. The collectors of transistors Q3 and Q4 are each connected to voltage source node V2, and the emitters of transistors Q3 and Q4 are connected respectively to the collectors of switching transistors Q1 and Q2. Diode D1 has its anode connected to voltage source node V1 and its cathode connected to the collector of switching transistor Q1, and diode D2 has its anode connected to voltage source node V1 and its cathode connected to the collector of switching transistor Q2.

In an initial input signal situation chosen for purposes of description, input signal node WDX has a high voltage (V1) and input signal node WDY has a low voltage (GND), for example. In the steady state in this situation, switching transistors Q1 and M2 in writer circuit 22 are turned on, switching transistors Q2 and M1 in writer circuit 22 are turned off, diode D1 in power supply circuit 24 is turned on, and diode D2 in power supply circuit 24 is turned off. The voltages at circuit head nodes H1 and H2 are approximately V1−VD−VBE, as the resistance of inductive coil $L_H$ is low (where VD is the voltage drop across diode D1 when turned on, and VBE is the voltage drop across the base-emitter pn junction of transistor Q1). Current Iw is drawn from voltage source node V1, through diode D1, through the collector and emitter of switching transistor Q1, through magnetic write head 21 from head node H1 to H2, through current generator I2, through the drain and source of switching transistor M2, and into voltage source node GND. In addition, transistor Q4 in power supply circuit 24 is turned on, and transistor Q3 in power supply circuit 24 is turned off. As a result, the voltage at the collector of switching transistor Q2 (which is equal to the voltage at the emitter of transistor Q4) is approximately V2−VBE, and the voltage at the collector of switching transistor Q1 (which is equal to the voltage at the emitter of transistor Q3) is approximately V1−VD (where VBE is the voltage drop across the base-emitter pn junction of transistor Q4, and VD is the voltage drop across diode D1 when turned on).

When the input signal on nodes WDX and WDY is subsequently changed to then have a high voltage (V1) at input signal node WDY and a low voltage (GND) at input signal node WDX, amplifiers A3 and A4 pass this change therethrough to turn on switching transistor M1 in writer circuit 22 and turn off switching transistor M2 in writer circuit 22. In addition, in this circumstance, time delay device TD1 of power supply circuit 24 receives a high voltage signal at its input node, and time delay device TD2 of power supply circuit 24 receives a low voltage signal at its input node. Because time delay devices TD1 and TD2 each provide a time delay of about 100 ps to about 500 ps, transistor Q3 of power supply circuit 24 remains initially still turned off and transistor Q4 of power supply circuit 24 remains initially still turned on. As a result, the voltage at the collector of switching transistor Q1 remains initially V1−VD and the voltage at the collector of switching transistor Q2 remains initially V2−VBE. Furthermore, in this circumstance, amplifier A1 passes the low voltage at input signal node WDX therethrough to cause the voltage at the base of switching transistor Q1 to initially drop to approximately GND, and amplifier A2 passes the high voltage at input signal node WDY therethrough to turn on switching transistor Q2 and cause the voltage at the base of switching transistor Q2 to initially rise to approximately V2−VBE. This is because amplifier A2 has a gain of V2/V1 and its first supply node is connected to the collector of switching transistor Q2 (which has a voltage of V2−VBE).

Because the voltage at head node H1 (which is equal to the voltage at the emitter of switching transistor Q1) is approximately −VBE and the voltage at head node H2 (which is equal to the voltage at the emitter of switching transistor Q2) is approximately V2−2VBE, a voltage drop of approximately V2−VBE volts is initially created across inductive coil $L_H$ from head node H2 to H1. As a result, the current through inductive coil $L_H$ (which, prior to the change at input signal nodes WDX and WDY, was flowing through inductive coil $L_H$ from head node H1 to H2) will follow the change in polarity across inductive coil $L_H$ and ultimately change direction and flow through inductive coil $L_H$ from head node H2 to H1.

After the change in direction of current through inductive coil $L_H$ so that a current approximately equal to Iw now flows from head node H2 to H1, the voltage at head node H1 will begin to rise to nearly the voltage at head node H2. This is because once the direction of the current through inductive coil $L_H$ is established, the rate of change of the current will decrease to nearly zero because the resistance of inductive coil $L_H$ is relatively small. Also, the voltage at head node H2 is held approximately constant during the time delay of time delay devices TD1 and TD2 because the voltage drop VBE across the base-emitter pn junction of switching transistor Q2 (which is turned on) is approximately constant. This decreasing voltage across inductive coil $L_H$ causes switching transistor Q1 to turn off because the voltage at the emitter of switching transistor Q1 (which is equal to the voltage at head node H1) is no longer a VBE lower than the voltage at its base (which is held at approximately GND).

After the time delay (about 100 ps to about 500 ps) of time delay devices TD1 and TD2, amplifier A5 receives a high voltage signal at its input node from the output node of time delay device TD1, and amplifier A6 receives a low voltage signal at its input node from the output node of time delay device TD2. Amplifier A5 passes the high voltage signal therethrough to turn on transistor Q3 and cause the voltage at the base of transistor Q3 to rise to approximately V2. This is because amplifier A5 has a gain of V2/V1 and its first supply node is connected to voltage source node V2. In addition, amplifier A6 passes the low voltage signal therethrough to turn off transistor Q4 and cause the voltage at the base of transistor Q4 to drop to approximately GND.

At this time, diode D1 is turned off because the voltage at the emitter of transistor Q3 is higher than V1−VD, and diode D2 is turned on because the voltage at the emitter of transistor Q4 is no longer higher than V1−VD. As a result, the voltage at the collector of switching transistor Q2 is reduced to approximately V1−VD now that current is being drawn through diode D2. This in turn causes the voltage at the base of switching transistor Q2 to be approximately V1−VD and the voltages at head nodes H1 and H2 to be approximately V1−VD−VBE. In addition, the voltage at the collector of switching transistor Q1 (which is equal to the voltage at the emitter of transistor Q3) is increased to approximately V2−VBE.

Therefore, because switching transistors Q2 and M1 are turned on and switching transistors Q1 and M2 are turned off with a high voltage at node WDY and a low voltage at node WDX, a current approximately equal to Iw is drawn from voltage source node V1, through diode D2, through the collector and emitter of switching transistor Q2, through magnetic write head 21 from head node H2 to H1, through the drain and source of switching transistor M1, and into voltage source node GND. As described above, a maximum voltage drop of approximately V2−VBE volts is initially created across inductive coil $L_H$ from head node H2 to H1 at the beginning of the input situation to reverse the direction of current through inductive coil $L_H$ as quickly as possible. Then, after the time delay of time delay devices TD1 and TD2, current Iw is drawn from voltage source node V1 instead of voltage source node V2 to reduce the voltages at head nodes H1 and H2 and thus the power consumption of magnetic write circuit 20.

When the input signal on nodes WDX and WDY is subsequently changed to again have a high voltage (V1) at input signal node WDX and a low voltage (GND) at input signal node WDY as in the initial input signal steady state situation described above, amplifiers A3 and A4 pass this change therethrough to turn on switching transistor M2 in writer circuit 22 and turn off switching transistor M1 in writer circuit 22. In addition, in this circumstance, time delay device TD2 of power supply circuit 24 receives a high voltage signal at its input node, and time delay device TD1 of power supply circuit 24 receives a low voltage signal at its input node. Because time delay devices TD1 and TD2 each provide a time delay of about 100 ps to about 500 ps, transistor Q4 of power supply circuit 24 remains initially still turned off and transistor Q3 of power supply circuit 24 remains initially still turned on. As a result, the voltage at the collector of switching transistor Q2 remains initially V1−VD and the voltage at the collector of switching transistor Q2 remains initially V2−VBE. Furthermore, in this circumstance, amplifier A2 passes the low voltage at input signal node WDY therethrough to cause the voltage at the base of switching transistor Q2 to initially drop to approximately GND, and amplifier A1 passes the high voltage at input signal node WDX therethrough to turn on switching transistor Q1 and cause the voltage at the base of switching transistor Q1 to initially rise to approximately V2−VBE. This is because amplifier A1 has a gain of V2/V1 and its first supply node is connected to the collector of switching transistor Q1 (which has a voltage of V2−VBE).

Because the voltage at head node H2 (which is equal to the voltage at the emitter of switching transistor Q2) is approximately −VBE and the voltage at head node H1 (which is equal to the voltage at the emitter of switching transistor Q1) is approximately V2−2VBE, a voltage drop of approximately V2−VBE volts is initially created across inductive coil $L_H$ from head node H1 to H2. As a result, the current through inductive coil $L_H$ (which, prior to the change at input signal nodes WDX and WDY, was flowing through inductive coil $L_H$ from head node H2 to H1) will follow the change in polarity across inductive coil $L_H$ and ultimately change direction and flow through inductive coil $L_H$ from head node H1 to H2.

After the change in direction of current through inductive coil $L_H$ so that a current approximately equal to Iw now flows from head node H1 to H2, the voltage at head node H2 will begin to rise to nearly the voltage at head node H1. This is because once the direction of the current through inductive coil $L_H$ is established, the rate of change of the current will decrease to nearly zero because the resistance of inductive coil $L_H$ is relatively small. Also, the voltage at head node H1 is held approximately constant during the time delay of time delay devices TD1 and TD2 because the voltage drop VBE across the base-emitter pn junction of switching transistor Q1 (which is turned on) is approximately constant. This decreasing voltage across inductive coil $L_H$ causes switching transistor Q2 to turn off because the voltage at the emitter of switching transistor Q2 (which is equal to the voltage at head node H1) is no longer a VBE lower than the voltage at its base (which is held at approximately GND).

After the time delay (about 100 ps to about 500 ps) of time delay devices TD1 and TD2, amplifier A6 receives a high voltage signal at its input node from the output node of time delay device TD2, and amplifier A5 receives a low voltage signal at its input node from the output node of time delay device TD1. Amplifier A6 passes the high voltage signal therethrough to turn on transistor Q4 and cause the voltage at the base of transistor Q4 to rise to approximately V2. This is because amplifier A6 has a gain of V2/V1 and its first supply node is connected to voltage source node V2. In addition, amplifier A5 passes the low voltage signal therethrough to turn off transistor Q3 and cause the voltage at the base of transistor Q3 to drop to approximately GND.

At this time, diode D2 is turned off because the voltage at the emitter of transistor Q4 is higher than V1−VD, and diode D1 is turned on because the voltage at the emitter of transistor Q3 is no longer higher than V1−VD. As a result, the voltage at the collector of switching transistor Q1 is reduced to approximately V1−VD now that current is being drawn through diode D1. This in turn causes the voltage at the base of switching transistor Q1 to be approximately V1−VD and the voltages at head nodes H1 and H2 to be approximately V1−VD−VBE. In addition, the voltage at the collector of switching transistor Q2 (which is equal to the voltage at the emitter of transistor Q4) is increased to approximately V2−VBE.

Therefore, because switching transistors Q1 and M2 are turned on and switching transistors Q2 and M1 are turned off with a high voltage at node WDX and a low voltage at node WDY, a current approximately equal to Iw is drawn from voltage source node V1, through diode D1, through the collector and emitter of switching transistor Q1, through magnetic write head 21 from head node H1 to H2, through the drain and source of switching transistor M2, and into voltage source node GND. As described above, a maximum voltage drop of approximately V2−VBE volts is initially created across inductive coil $L_H$ from head node H1 to H2 at the beginning of the input situation to reverse the direction of current through inductive coil $L_H$ as quickly as possible. Then, after the time delay of time delay devices TD1 and TD2, current Iw is drawn from voltage source node V1 instead of voltage source node V2 to reduce the voltage at head nodes H1 and H2 and thus the power consumption of magnetic write circuit 20.

The actual power savings of magnetic write circuit 20 is frequency dependent and is shown in Table 1.

TABLE 1

| Data Rate | Power Consumption w/continuous 12 V power supply | Power Consumption w/pulse mode power supply | Power Savings |
| --- | --- | --- | --- |
| 1 MB/sec | 867 mW | 243 mW | 72% |
| 1 GB/sec | 1067 mW | 732 mW | 30% |

Figure 3:
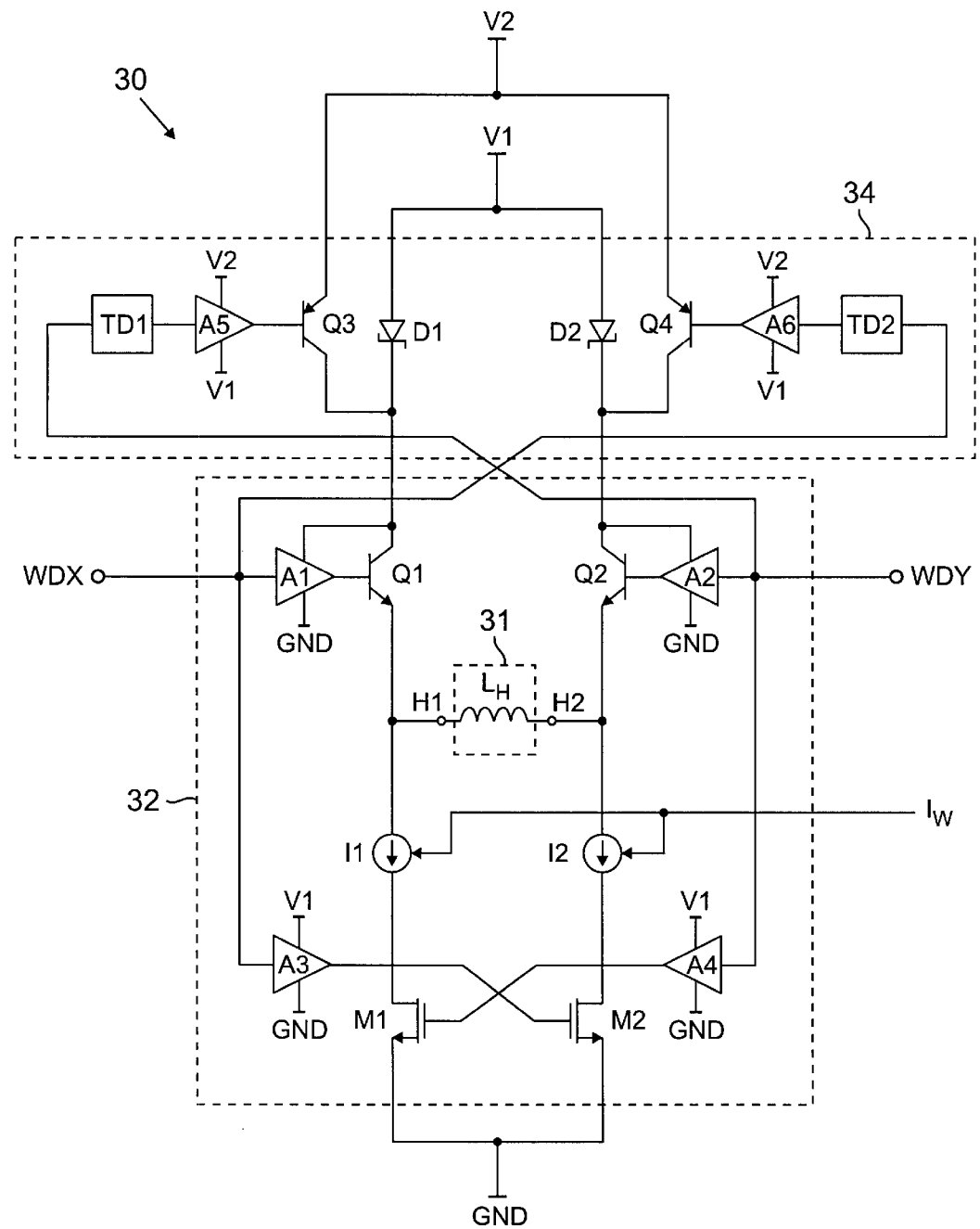
FIG. 3 shows a circuit schematic diagram of a second embodiment of a magnetic write circuit of the present invention.

FIG. 3 shows a circuit schematic diagram of a second embodiment of a magnetic write circuit 30 of the present invention. Magnetic write circuit 30 is part of a disk drive system and controls the magnitude and direction of current through a magnetic write head 31 represented in the diagram as an inductive coil $L_H$. Magnetic write head 31, which is coupled into the remainder of the circuit between circuit head nodes H1 and H2, includes inductive coil $L_H$ along with magnetic material positioned in magnetic fields generated by current therethrough. Magnetic write circuit 30 includes writer circuit 32, power supply circuit 34, input signal circuit nodes WDX and WDY, the circuit head nodes H1 and H2 previously mentioned, and voltage source nodes V1, V2, and GND (where a significantly higher voltage is provided at voltage source node V2 than at voltage source node V1). Magnetic write circuit 30 is preferably fabricated in an integrated circuit.

Writer circuit 32 is identical to writer circuit 22 of magnetic write circuit 20. Power supply circuit 34, however, differs from power supply circuit 24 of magnetic write circuit 20 in that transistors Q3 and Q4 in power supply circuit 34 are pnp bipolar junction transistors (each having a base, an emitter, and a collector) instead of the npn bipolar junction transistors used in power supply circuit 24. Unlike npn bipolar junction transistors that use a high voltage at the base to turn the transistor on and a low voltage at the base to turn the transistor off, pnp bipolar junction transistors use a low voltage at the base to turn the transistor on and a high voltage at the base to turn the transistor off. For this reason, input signal circuit node WDX is connected to the input node of time delay device TD1 instead of time delay device TD2, and input signal circuit node WDY is connected to the input node of time delay device TD2 instead of time delay device TD1. Amplifier A5 has its output node connected to the base of transistor Q3, and its first and second supply nodes connected respectively to voltage source nodes V2 and V1. Amplifier A6 has its output node connected to the base of transistor Q4, and its first and second supply nodes connected respectively to voltage source nodes V2 and V1. Transistor Q3 has its emitter connected to voltage source node V2 and its collector connected to the collector of switching transistor Q1. Transistor Q4 has its emitter connected to voltage source node V2 and its collector connected to the collector of switching transistor Q2.

When transistor Q3 is turned on, the voltage at the collector of switching transistor Q1 (which is equal to the voltage at the collector of transistor Q3) is approximately V2−VEB (where VEB is the voltage drop across the emitter-base pn junction of transistor Q3). When transistor Q3 is turned off, the voltage at the collector of switching transistor Q1 is approximately V1−VD (where VD is the voltage drop across diode D1 when turned on). Similarly, when transistor Q4 is turned on, the voltage at the collector of switching transistor Q2 (which is equal to the voltage at the collector of transistor Q4) is approximately V2−VEB (where VEB is the voltage drop across the emitter-base pn junction of transistor Q4). When transistor Q4 is turned off, the voltage at the collector of switching transistor Q2 is approximately V1−VD (where VD is the voltage drop across diode D2 when turned on). Therefore, magnetic write circuit 30 creates a maximum voltage drop of approximately V2−VEB volts across inductive coil $L_H$ at the beginning of an input situation to reverse the direction of current through inductive coil $L_H$ as quickly as possible. Then, after the time delay of time delay devices TD1 and TD2, current Iw is drawn from voltage source node V1 instead of voltage source node V2 to reduce the voltages at head nodes H1 and H2 and thus the power consumption of magnetic write circuit 30.

Figure 4:
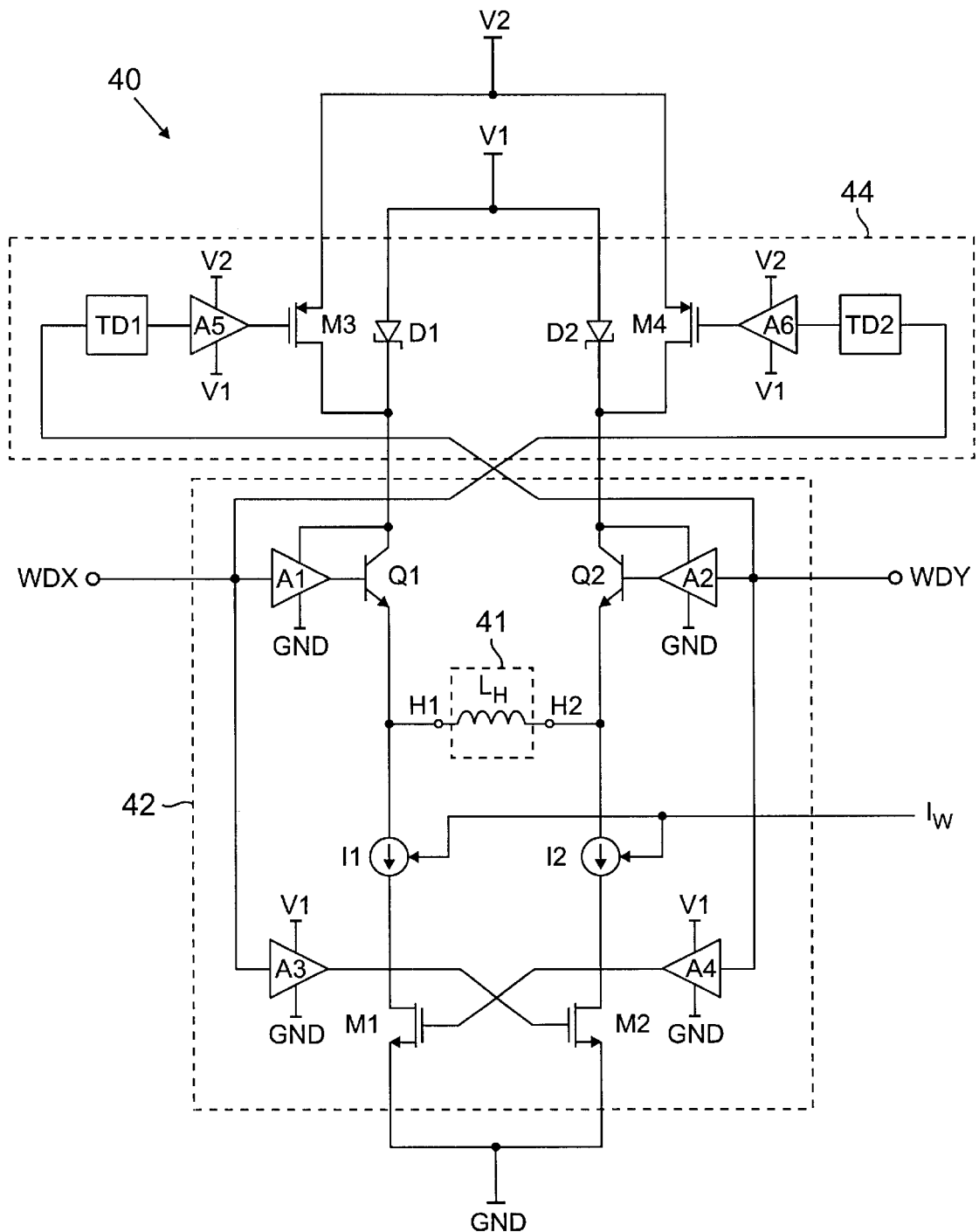
FIG. 4 shows a circuit schematic diagram of a third embodiment of a magnetic write circuit of the present invention.

FIG. 4 shows a circuit schematic diagram of a third embodiment of a magnetic write circuit 40 of the present invention. Magnetic write circuit 40 is part of a disk drive system and controls the magnitude and direction of current through a magnetic write head 41 represented in the diagram as an inductive coil $L_H$. Magnetic write head 41, which is coupled into the remainder of the circuit between circuit head nodes H1 and H2, includes inductive coil $L_H$ along with magnetic material positioned in magnetic fields generated by current therethrough. Magnetic write circuit 40 includes writer circuit 42, power supply circuit 44, input signal circuit nodes WDX and WDY, the circuit head nodes H1 and H2 previously mentioned, and voltage source nodes V1, V2, and GND (where a significantly higher voltage is provided at voltage source node V2 than at voltage source node V1). Magnetic write circuit 40 is preferably fabricated in an integrated circuit.

Writer circuit 42 is identical to writer circuit 32 of magnetic write circuit 30. Power supply circuit 44, however, differs from power supply circuit 34 of magnetic write circuit 30 in that transistors Q3 and Q4 are replaced by transistors M3 and M4. Transistors M3 and M4 are PMOS transistors each having a gate, a source, and a drain. Similar to the pnp bipolar junction transistors of power supply circuit 34 that use a low voltage at the base to turn the transistor on and a high voltage at the base to turn the transistor off, the PMOS transistors of power supply circuit 44 use a low voltage at the gate to turn the transistor on and a high voltage at the gate to turn the transistor off. Transistor M3 has its source connected to voltage source node V2, its gate connected to the output node of amplifier A5, and its drain connected to the collector of switching transistor Q1. Transistor M4 has its source connected to voltage source node V2, its gate connected to the output node of amplifier A6, and its drain connected to the collector of switching transistor Q2.

When transistor M3 is turned on, the voltage at the collector of switching transistor Q1 (which is equal to the voltage at the drain of transistor M3) is approximately V2−VSD (where VSD is the voltage drop across the source-drain junction of transistor M3). When transistor M3 is turned off, the voltage at the collector of switching transistor Q1 is approximately V1−VD (where VD is the voltage drop across diode D1 when turned on). Similarly, when transistor M4 is turned on, the voltage at the collector of switching transistor Q2 (which is equal to the voltage at the drain of transistor M4) is approximately V2−VSD (where VSD is the voltage drop across the source-drain junction of transistor M4). When transistor M4 is turned off, the voltage at the collector of switching transistor Q2 is approximately V1−VD (where VD is the voltage drop across diode D2 when turned on). Therefore, magnetic write circuit 40 creates a maximum voltage drop of approximately V2−VSD volts across inductive coil $L_H$ at the beginning of an input situation to reverse the direction of current through inductive coil $L_H$ as quickly as possible. Then, after the time delay of time delay devices TD1 and TD2, current Iw is drawn from voltage source node V1 instead of voltage source node V2 to reduce the voltages at head nodes H1 and H2 and thus the power consumption of magnetic write circuit 40.

In summary, the present invention introduces a magnetic write circuit that maximizes the head swing voltage while minimizing the power consumption of the circuit. By utilizing a pulse-mode power supply circuit, the magnetic write circuit takes advantage of a higher supply voltage source to maximize the head swing voltage at the beginning of an input situation, and then draws current from a lower supply voltage source for the remainder of the input situation to minimize the power consumption of the circuit.

Although the present invention has been described with reference to preferred embodiments, workers skilled in the art will recognize that changes may be made in form and detail without departing from the spirit and scope of the invention.

What is claimed is:

1. A disk drive system including a write circuit for controlling current through a magnetic write head, the write circuit comprising:

an H-switch circuit for controlling direction of current through the write head; and a pulse-mode power supply circuit connected to the H-switch circuit for providing a higher voltage pulse at a beginning of a switching event of the H-switch circuit to accelerate a change in direction of current through the write head, followed by a lower voltage until a next switching event.

2. The disk drive system of claim 1 wherein the H-switch circuit comprises:

first and second input signal nodes for receiving input signals;

first and second head nodes for connection to the write head;

a first switch having a conduction path between first and second conduction path regions wherein the second conduction path region is connected to the first head node, the first switch further having a control region responsive to control signals for controlling conduction through the conduction path;

a second switch having a conduction path between first and second conduction path regions wherein the second conduction path region is connected to the second head node, the second switch further having a control region responsive to control signals for controlling conduction through the conduction path;

a third switch having a conduction path between first and second conduction path regions which are connected in series between the first head node and a fixed potential, the third switch further having a control region responsive to control signals for controlling conduction through the conduction path; and a fourth switch having a conduction path between first and second conduction path regions which are connected in series between the second head node and the fixed potential, the fourth switch further having a control region responsive to control signals for controlling conduction through the conduction path.

3. The disk drive system of claim 2 wherein each of the switches includes a transistor.

4. The disk drive system of claim 3 wherein the transistors of the first and second switches are bipolar junction transistors having a collector, an emitter, and a base and wherein the collector is the first conduction path region, the emitter is the second conduction path region, and the base is connected to the control region.

5. The disk drive system of claim 3 wherein the transistors of the third and fourth switches are MOS transistors having a drain, a source, and a gate and wherein the drain is the first conduction path region, the source is the second conduction path region, and the gate is connected to the control region.

6. The disk drive system of claim 3 wherein each of the switches further includes an amplifier for driving the transistor.

7. The disk drive system of claim 2 wherein the H-switch circuit farther comprises:
    a first current generator connected between the first head node and the first conduction path region of the third switch; and
    a second current generator connected between the second head node and the first conduction path region of the fourth switch.

8. The disk drive system of claim 2 wherein the pulse-mode power supply circuit comprises:
    first and second supply voltage nodes for connection to first and second supply voltages wherein the second supply voltage is significantly higher than the first supply voltage;
    first and second time delay devices having an input region and an output region for providing a time delay between the input region and the output region, wherein the input regions are each connected to a corresponding one of the input signal nodes;
    a first voltage switch having a conduction path between first and second conduction path regions which are connected in series between the second supply voltage node and the first conduction path region of the first switch, the first voltage switch further having a control region connected to the output region of the first time delay device responsive to control signals for controlling conduction through the conduction path;
    a second voltage switch having a conduction path between first and second conduction path regions which are connected in series between the second supply voltage node and the first conduction path region of the second switch, the second voltage switch further having a control region connected to the output region of the second time delay device responsive to control signals for controlling conduction through the conduction path;
    a first diode having an anode and a cathode wherein the anode is connected to the first supply voltage node and the cathode is connected to the first conduction path region of the first switch; and
    a second diode having an anode and a cathode wherein the anode is connected to the first supply voltage node and the cathode is connected to the first conduction path region of the second switch.

9. The disk drive system of claim 8 wherein the time delay of each of the time delay devices is in a range of about 100 ps to about 500 ps.

10. The disk drive system of claim 8 wherein each of the voltage switches includes a transistor.

11. The disk drive system of claim 10 wherein the transistors are bipolar junction transistors having a collector, an emitter, and a base and wherein the collector is the first conduction path region, the emitter is the second conduction path region, and the base is connected to the control region.

12. The disk drive system of claim 10 wherein the transistors are bipolar junction transistors having an emitter, a collector, and a base and wherein the emitter is the first conduction path region, the collector is the second conduction path region, and the base is connected to the control region.

13. The disk drive system of claim 10 wherein the transistors are MOS transistors having a source, a drain, and a gate and wherein the source is the first conduction path region, the drain is the second conduction path region, and the gate is connected to the control region.

14. The disk drive system of claim 10 wherein each of the voltage switches further includes an amplifier for driving the transistor.

15. The disk drive system of claim 8 wherein each of the diodes are Schottky diodes.

16. The disk drive system of claim 1 wherein the H-switch circuit and the pulse-mode power supply circuit are fabricated in an integrated circuit.

17. A write circuit for controlling current through a magnetic write head, the write circuit comprising:
    a switch network for controlling direction of current through the write head; and
    means for selectively connecting the switch network to a higher supply voltage at a beginning of a switching event of the switch network to accelerate a change in direction of current through the write head and then to a lower supply voltage until a next switching event.

18. The write circuit of claim 17 wherein the means for selectively connecting the switch network to a higher supply voltage and then to a lower supply voltage includes a time delay circuit.

19. The write circuit of claim 17 wherein the switch network comprises:
    first and second input signal nodes for receiving input signals;
    first and second head nodes for connection to the write head;
    a first switch having a conduction path between first and second conduction path regions wherein the second conduction path region is connected to the first head node, the first switch further having a control region responsive to control signals for controlling conduction through the conduction path;
    a second switch having a conduction path between first and second conduction path regions wherein the second conduction path region is connected to the second head node, the second switch further having a control region responsive to control signals for controlling conduction through the conduction path;
    a third switch having a conduction path between first and second conduction path regions which are connected in series between the first head node and a fixed potential, the third switch further having a control region responsive to control signals for controlling conduction through the conduction path; and
    a fourth switch having a conduction path between first and second conduction path regions which are connected in series between the second head node and the fixed potential, the fourth switch further having a control region responsive to control signals for controlling conduction through the conduction path.

20. The write circuit of claim 19 wherein each of the switches includes a transistor.

21. The write circuit of claim 20 wherein the transistors of the first and second switches are bipolar junction transistors having a collector, an emitter, and a base and wherein the collector is the first conduction path region, the emitter is the second conduction path region, and the base is connected to the control region.

22. The write circuit of claim 20 wherein the transistors of the third and fourth switches are MOS transistors having a drain, a source, and a gate and wherein the drain is the first conduction path region, the source is the second conduction path region, and the gate is connected to the control region.

23. The write circuit of claim 20 wherein each of the switches further includes an amplifier for driving the transistor.

24. The write circuit of claim 19 wherein the switch network further comprises:
   a first current generator connected between the first head node and the first conduction path region of the third switch; and
   a second current generator connected between the second head node and the first conduction path region of the fourth switch.

25. The write circuit of claim 19 wherein the means for selectively connecting the switch network to a higher supply voltage and then to a lower supply voltage comprises:
   first and second supply voltage nodes for connection to first and second supply voltages wherein the second supply voltage is significantly higher than the first supply voltage;
   first and second time delay devices having an input region and an output region for providing a time delay between the input region and the output region, wherein the input regions are each connected to a corresponding one of the input signal nodes;
   a first voltage switch having a conduction path between first and second conduction path regions which are connected in series between the second supply voltage and the first conduction path region of the first switch, the first voltage switch further having a control region connected to the output region of the first time delay device responsive to control signals for controlling conduction through the conduction path;
   a second voltage switch having a conduction path between first and second conduction path regions which are connected in series between the second supply voltage and the first conduction path region of the second switch, the second voltage switch further having a control region connected to the output region of the second time delay device responsive to control signals for controlling conduction through the conduction path;
   a first diode having an anode and a cathode wherein the anode is connected to the first supply voltage and the cathode is connected to the first conduction path region of the first switch; and
   a second diode having an anode and a cathode wherein the anode is connected to the first supply voltage and the cathode is connected to the first conduction path region of the second switch.

26. The write circuit of claim 25 wherein the time delay of each of the time delay devices is in a range of about 100 ps to about 500 ps.

27. The write circuit of claim 25 wherein each of the voltage switches includes a transistor.

28. The write circuit of claim 27 wherein the transistors are bipolar junction transistors having a collector, an emitter, and a base and wherein the collector is the first conduction path region, the emitter is the second conduction path region, and the base is connected to the control region.

29. The write circuit of claim 27 wherein the transistors are bipolar junction transistors having an emitter, a collector, and a base and wherein the emitter is the first conduction path region, the collector is the second conduction path region, and the base is connected to the control region.

30. The write circuit of claim 27 wherein the transistors are MOS transistors having a source, a drain, and a gate and wherein the source is the first conduction path region, the drain is the second conduction path region, and the gate is connected to the control region.

31. The write circuit of claim 27 wherein each of the voltage switches further includes an amplifier for driving the transistor.

32. The write circuit of claim 25 wherein each of the diodes are Schottky diodes.

33. The write circuit of claim 17 wherein the switch network and the means for selectively connecting the switch network to a higher supply voltage and then to a lower supply voltage are fabricated in an integrated circuit.

* * * * *